United States Patent [19]
Tsai

[11] Patent Number: 5,959,745
[45] Date of Patent: *Sep. 28, 1999

[54] TRANSMISSION MECHANISM FOR AN IMAGE INFORMATION READING APPARATUS

[75] Inventor: Jenn-Tsair Tsai, Tao-Yuan, Taiwan

[73] Assignee: Must Systems, Inc., Hsinchu, Taiwan

[ * ] Notice: This patent issued on a continued prosecution application filed under 37 CFR 1.53(d), and is subject to the twenty year patent term provisions of 35 U.S.C. 154(a)(2).

[21] Appl. No.: 08/639,450

[22] Filed: Apr. 29, 1996

[51] Int. Cl.⁶ .............................. H04N 1/36; H04N 1/04; G03G 15/04; G03G 15/28
[52] U.S. Cl. .................... 358/474; 358/497; 358/410; 358/475; 399/208; 250/208.1; 250/234
[58] Field of Search ................... 358/474, 475, 358/487, 494, 410, 497, 409; 399/206, 208, 211; 250/208.1, 234, 216

[56] References Cited

U.S. PATENT DOCUMENTS 5,455,412  10/1995  Imagawa et al. ............... 250/208.1
5,585,627  12/1996  Akutsu et al. .................. 250/234
5,724,173   3/1998  Chuan ............................ 250/234

FOREIGN PATENT DOCUMENTS 29618433  12/1996  Germany ..................... H04N 1/10

*Primary Examiner*—Kim Yen Vu
*Assistant Examiner*—Kimberly A. Williams
*Attorney, Agent, or Firm*—Harness, Dickey & Pierce, P.L.C.

[57] ABSTRACT

A simplified transmission mechanism is provided for an image information apparatus. The transmission mechanism mainly includes a first pair of supports for guiding an illuminating unit, a second pair of supports beneath and parallel to the first pair of supports for guiding a photoelectric converting unit, four pulleys each located at the corners and on the same side of a housing, and a conveying device surrounding four pulleys in the shape of a closed loop for driving the illuminating unit to slide along the first pair of supports in a first direction and the photoelectric converting units to slide along the second pair of supports in a second direction at the same time and at the same speed.

14 Claims, 5 Drawing Sheets

TRANSMISSION MECHANISM FOR AN IMAGE INFORMATION READING APPARATUS

BACKGROUND OF THE INVENTION

A. Field of the Invention

The present invention relates to an image information reading apparatus, especially to a scanner having a simple-structure transmission mechanism which conveys an illuminating unit and photoelectric conversion unit in different directions at the same time and same speed.

B. Description of the Prior Art

An image information reading apparatus relies on the driving mechanism to maintain a stable and fixed light path, thereby to generate high quality images. Accordingly, the driving mechanisms can be roughly classified as simple and complex. FIG. 1 shows a scanner inside a housing with a simple-structure driving device. Referring to FIG. 1, the driving mechanism as shown in FIG. 1 is simple because all the optical elements for reading information off the original sheets are installed in the same carriage 102, including straight-tube fluorescent lamp 103, an array of mirrors 106, 104, 105, and CCD line image sensor 107. When the image of a sheet is being scanned, the simple driving mechanism drives only carriage 102 mounted on support device 111 back and forth while the positions of the elements inside carriage 102 remain unchanged. When scanning, a sheet is placed on glass table 101 which is at the top of the housing. An exposure light beam emitted from straight-tube fluorescent lamp 103 is shone onto the sheet and is then reflected by the sheet. The array of mirrors 106, 104, 105 guide the light beam to CCD line image sensor 107 which converts the light beam into an electrical signal.

The advantage of the simple-structure driving mechanism is that the light path can be easily controlled because all the optical elements are fixed in the carriage. However, the trade-off is that the size of the carriage becomes very bulky, heavy, and costly. If a compact scanner is desired, the scanner can hardly be made smaller based on this mechanism. For one thing, it requires at least the length of an original sheet for the carriage to move back and forth. For another thing, if the size of the scanner is reduced, the light path must also be reduced. In that case, the half-angle of the lens in front of a CCD linear sensor must be enlarged. However, in doing so, this arrangement will influence the brightness and clarity of the reflection.

A driving mechanism of complex structure is shown in FIG. 2. FIG. 2 shows a perspective view of a scanner inside a housing. The driving mechanism is complex because it requires two driving devices, one for the light source unit and the other for the arrays of mirrors. Light source unit 202 including a straight-tube fluorescent lamp 205 and a mirror 204 is fixed on light source unit 202. Other mirrors are fixed on optical member holder 201 for guiding a light beam to CCD linear image sensor 203 which is fixed on the housing. When scanning, a sheet is placed on the glass table on top of the housing, driving device moves light source unit 202 in Y distance while optical member holder 201 follows in ½ Y distance to keep the same light path. The complex driving mechanism can reduce the size of a scanner. However, its structure is very complex and difficult to assemble, which will inevitably raise the manufacturing cost of the apparatus. Moreover, since light source unit 202 and optical member holder 201 are both moving while scanning images, this arrangement is more likely to increase the light deflection or color deflection of reflective images.

SUMMARY OF THE INVENTION

It is therefore the object of the invention to provide an image information reading apparatus having a simple-structure transmission mechanism which can generate high quality images.

It is another object of the invention to provide an image information reading apparatus which can enlarge the light path, thereby improving the half-angle effect and thus to generating high-quality images.

It is a further object of the invention to provide an image information reading apparatus which is of a simple-structure and easy to assemble.

These and other objects of the invention, which will become more apparent as the invention is described more fully below, are obtained by providing an improved image information reading apparatus having a simple-structure transmission mechanism that drives an illuminating device and photoelectric conversion element in different directions in synchronism and at the same speed. The transmission mechanism includes rotating devices and a conveyor belt or a steel wire rope in the shape of a closed loop. When a motor is energized, it drives rotating devices which further drive the conveyor belt. The movement of the conveyor belt or the steel wire rope causes the illuminating carriage and photoelectric conversion element mounted on support device to move back and Thus, the invention is easy to assemble and lower in manufacture cost.

BRIEF DESCRIPTION OF THE DRAWINGS

These and other objects and advantages of the present invention will become apparent to those skilled in the art from the following detailed description thereof, taken in connection with the drawings, in which.

DETAILED DESCRIPTION OF THE PREFERRED EMBODIMENTS

Figure 1:
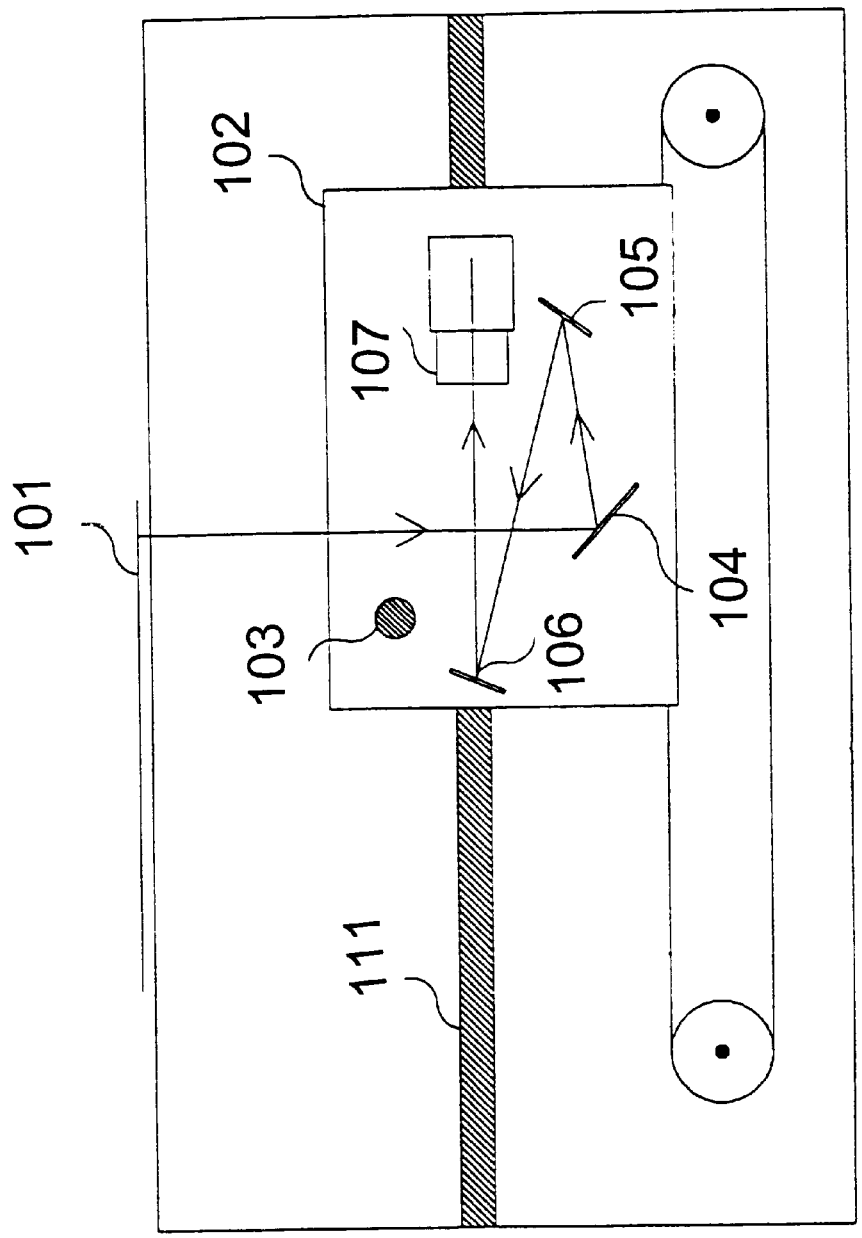
FIG. 1 is a perspective view showing a scanner with simple-structure driving device.
Figure 2:
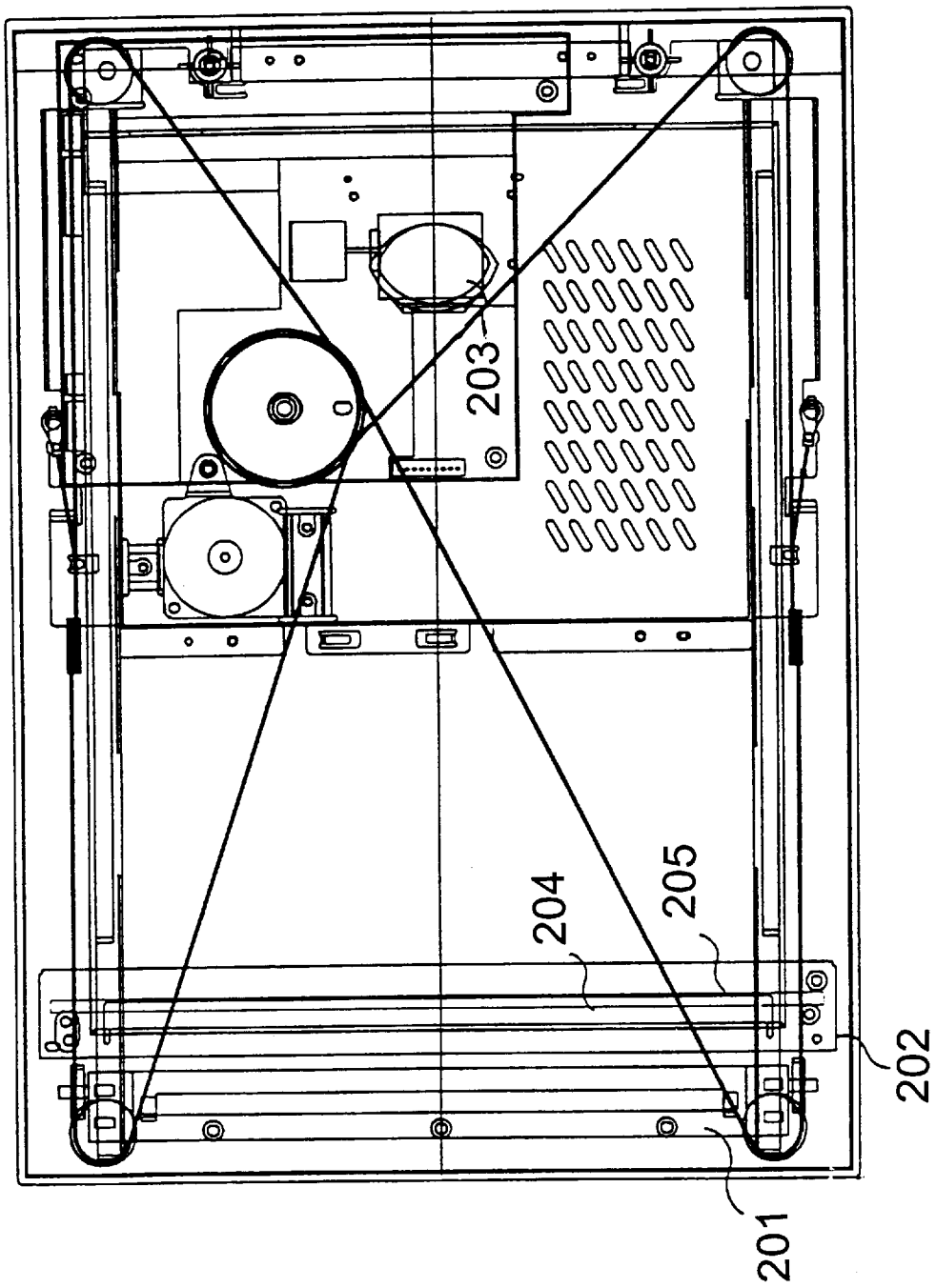
FIG. 2 is a perspective top view showing a scanner with a complex-structure driving device.
Figure 3:
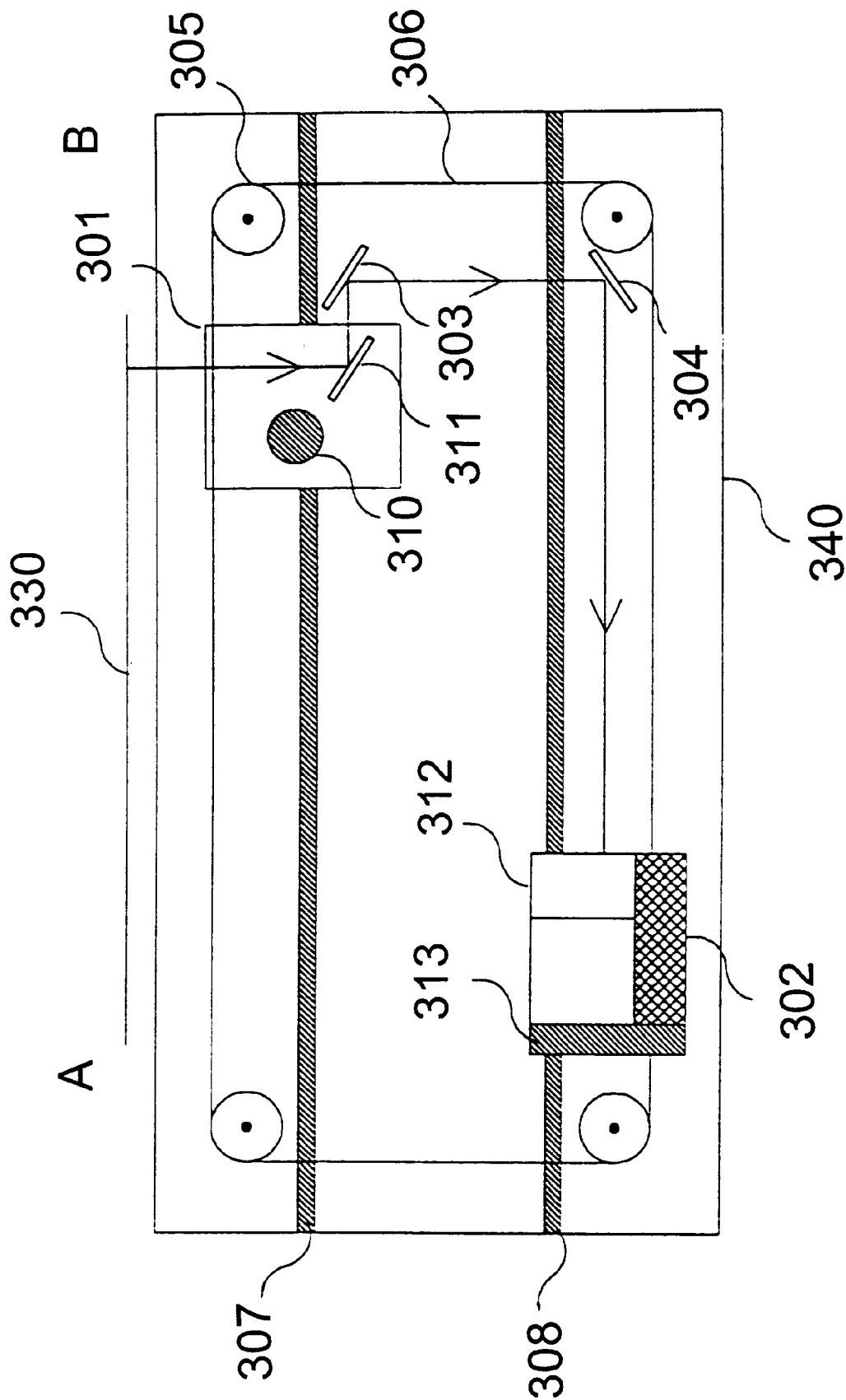
FIG. 3 is a perspective side view showing a scanner of the preferred embodiment of the invention.

The structure of a preferred embodiment of the invention is shown in FIG. 3. The invention is an image scanner which reads information off of reflective sheets, such as positive film, paper, etc. Referring to FIG. 3, the invention mainly encompasses illuminating unit 301, an array of mirrors 311, 303, 304, photoelectric conversion unit 302, and driving device.

When scanning, an original sheet 330 is placed on a glass table on top of the housing 340. Illuminating unit 301 which emits a light beam shone onto the sheet, is mounted on support device 307. Illuminating unit 301 includes a straight-tube fluorescent lamp 310 and a first mirror 311. The light beam reflected from the sheet 330 is guided to photoelectric conversion unit 302 via an array of mirrors. To maintain a stable light path, second mirror 303 and third mirror 304 are fixed on the housing for guiding the light beam to photoelectric conversion unit 302. Photoelectric conversion unit 302, which converts a light beam into an electrical signal, is mounted on support device 308. Photoelectric conversion unit 302 includes a line image sensor 313, such as a CCD line image sensor or a CIS line image sensor, and a lens 312.

The movement of illuminating unit 301 and photoelectric conversion unit 302 is controlled by a driving device which includes rotating devices 305, such as pulleys, and conveying device 306. To allow illuminating unit 301 and photoelectric conversion unit 302 to slide in the longitudinal direction of the housing, support device 307, 308 is a slide shaft or hinge shaft. When a motor (not shown) is energized, it drives rotating devices 305 located inside the housing. The rotating devices 305 further drive the conveying device 306 connected thereto. Conveying device 306 is a conveyor belt or a steel wire rope. Since conveying device 306 surrounds the rotating devices 305 in the shape of a closed loop, conveying device 306 will move illuminating unit 301 and photoelectric conversion unit 302 in synchronism and in different directions at the same speed. That is, conveying device 306 will move illuminating unit 301 from position A to position B while photoelectric conversion unit 302 move from position B to position A at the same time and same speed. Based on this simple structure driving device, the light path remains unchanged while illuminating unit 301 and photoelectric conversion unit 302 are moving back and forth on support devices 307, 308.

Figure 4:
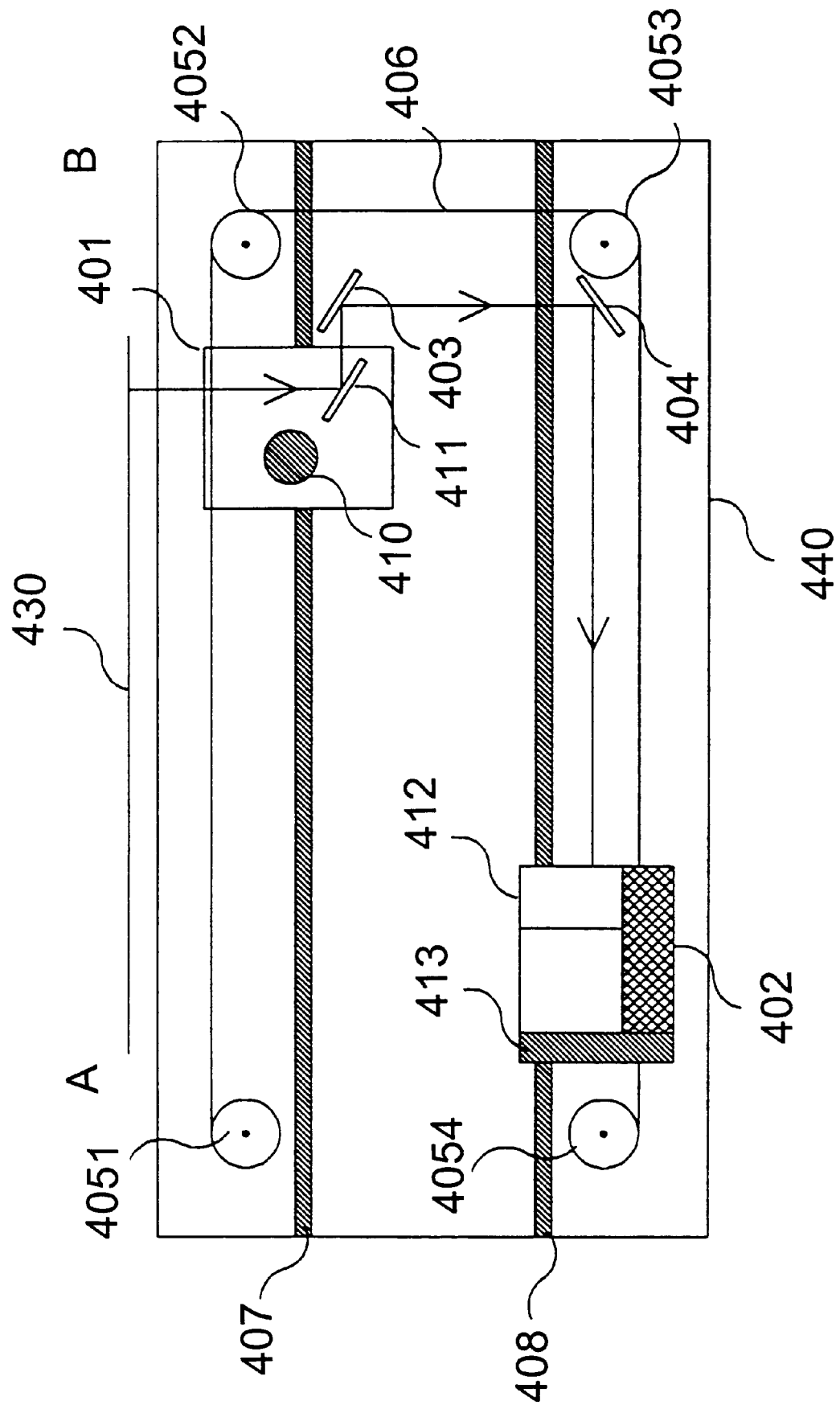
FIG. 4 is a perspective side view showing a scanner of another preferred embodiment of the invention.
Figure 5:
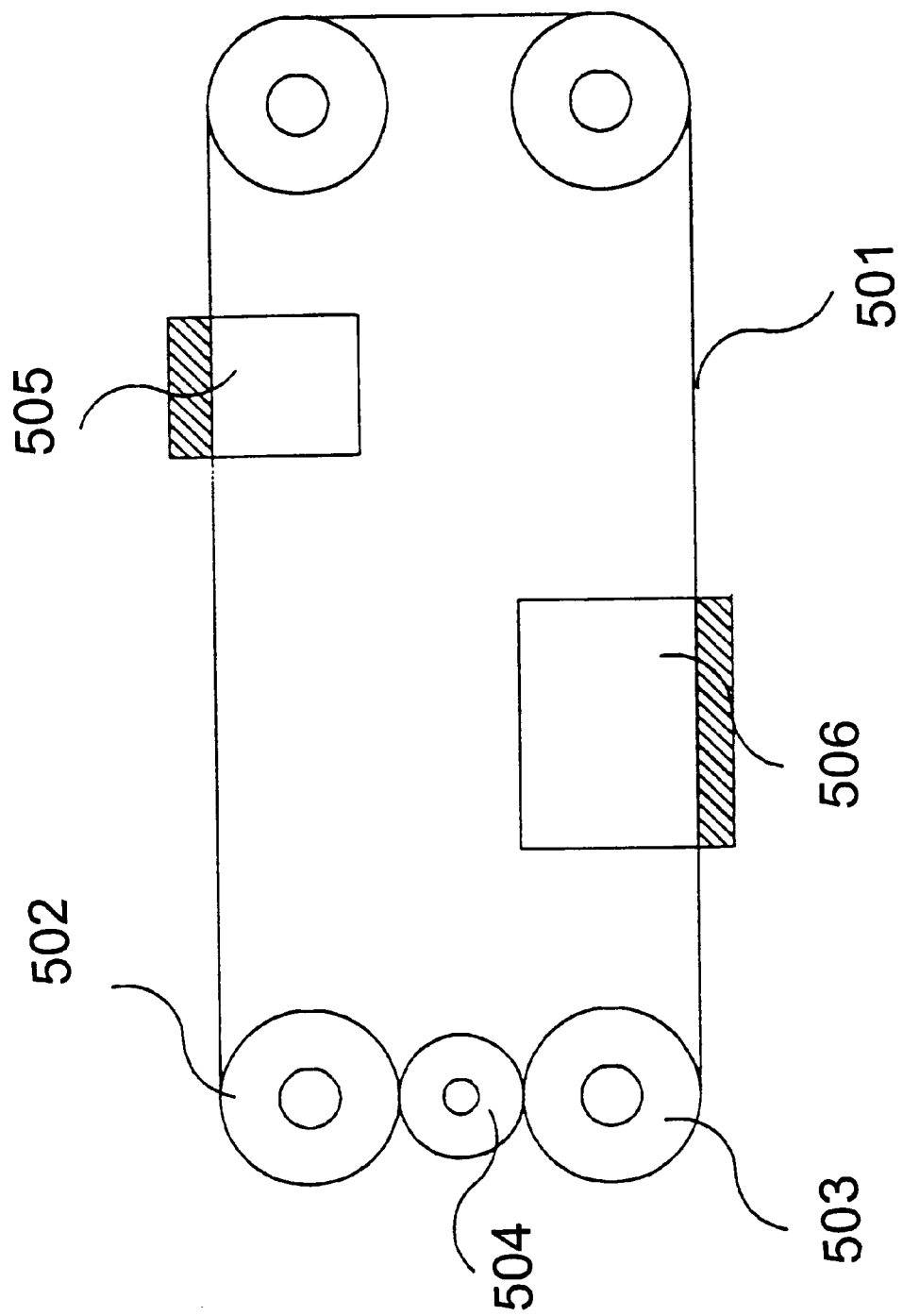
FIG. 5 is a perspective view showing a scanner of another preferred embodiment of the invention.

Any person skilled in the art will understand that the simple-structure transmission mechanism as disclosed above can have various modifications. The apparatus as shown in FIG. 4 and FIG. 5 indicates some possible modifications. Referring to FIG. 4, the driving device includes conveying device 406 and four pulleys, that is, first pulley 4051, second pulley 4052, third pulley 4053, and fourth pulley 4054. First pulley 4051 and fourth pulley 4054 are driving pulleys while second pulley 4052 and third pulley 4053 are driven pulleys. First pulley 4051 and fourth pulley 4054 are driven by a motor (not shown) respectively in turn. Conveying device 406 surrounds the four rotating devices 4051, 4052, 4053, and 4054 in the shape of a horseshoe. That is, there is no conveying device 406 connecting between first pulley 4051 and fourth pulley 4054.

Conveying device 406 which is in the shape of a horseshoe has a spring stay at each of its ends. When scanning, first pulley 4051 which is driven by a motor turns in a counter-clockwise direction. In such a direction, first pulley 4051 pulls conveying device 406 towards itself. As a result, illuminating unit 401 connecting to conveying device 406 is moved from position B to position A. At the same time, conveying device 406 also moves photoelectric conversion unit 402 from position A to position B at the same speed. When the scanning is complete, fourth pulley 4054 becomes the driving pulley and turns in a clockwise direction. Conveying device 406 is then driven towards fourth pulley 4054 and thus moves photoelectric conversion unit 402 from position B to position A. At the same time, conveying device 406 also moves illuminating unit 401 from position A to position B. In other words, illuminating unit 401 and photoelectric conversion unit 402 are always moving in different directions in synchronism and at the same speed.

Another possible modification is shown in FIG. 5. The apparatus of FIG. 5 is very close to that of FIG. 4. Referring to FIG. 5, the conveying device 501 is also in the shape of a horseshoe. First pulley 502 and second pulley 503 are both driven pulleys. They are driven by driving pulley 504 which is driven by a motor (not shown). When the motor is energized, driving pulley 504 turns in a counter-clockwise direction. As such, first pulley 502 and second pulley 503 are driven in a clockwise direction. This causes first rotating device 502 to spin conveying device 501 while second rotating device 503 loosens conveying device 501. The movement of conveying device 501 moves illuminating device 505 and photoelectric conversion unit 506 in different directions in synchronism and at the same speed.

Compared to the structure of the apparatus in the prior art, the structure of the invention is much simpler. With the simple-structure driving device, the structure of an image information reading apparatus can be simplified. Thus, the invention is easy to assemble. The manufacturing cost can also be reduced. Moreover, it provides a small, light-weighted image information reading apparatus without sacrificing the quality of scanned images.

It should be understood that various alternatives to the structures described herein may be employed in practicing the present invention. It is intended that the following claims define the invention and that the structure within the scope of these claims and their equivalents be covered thereby.

What is claimed is:

1. A transmission mechanism for an image information apparatus, having at least an illuminating unit and a photoelectric converting unit, the transmission mechanism comprising:

a first pair of supports for guiding the illuminating unit;

a second pair of supports beneath and parallel to said first pair of supports for guiding the photoelectric converting unit;

a housing having corners;

four pulleys each located at said corners and on the same side of said housing; and conveying means surrounding said four pulleys in the shape of a closed loop for driving the illuminating unit to slide along said first pair of supports in a first direction and the photoelectric converting unit to slide along said second pair of supports in a second direction at the same time and at the same speed as the illuminating unit.

2. The mechanism as claimed in claim 1, wherein said conveying means is a conveyor belt in the shape of a single closed loop.

3. The mechanism as claimed in claim 1, wherein said conveying means is a steel wire rope in the shape of a single closed loop.

4. The mechanism as claimed in claim 1, wherein said first supports are sliding shafts.

5. The mechanism as claimed in claim 1, wherein said first supports are hinge shafts.

6. The mechanism as claimed in claim 1, wherein said second supports are sliding shafts.

7. The mechanism as claimed in claim 1, wherein said second supports are hinge shafts.

8. A transmission mechanism for an image information apparatus having at least an illuminating unit and a photoelectric converting unit, the transmission mechanism comprising:

a first pair of supports for mounting the illuminating unit;

a second pair of supports beneath and parallel to said first pair of supports for mounting the photoelectric converting unit;

a housing having corners;

four pulleys each located at said corners and on the same side of said housing;

a driving motor connecting to two of said four pulleys on one side; and conveying means connecting to said four pulleys in the shape of a horseshoe for driving the illuminating unit to slide along said first pair of supports in a first direction and the photoelectric converting unit to slide along said second pair of supports in a second direction at the same time and at the same speed as the illuminating unit.

9. The mechanism as claimed in claim 8, wherein said conveying means is a conveyor belt in the shape of a single closed loop.

10. The mechanism as claimed in claim 8, wherein said conveying means is a steel wire rope in the shape of a single closed loop.

11. The mechanism as claimed in claim 8, wherein said first supports are sliding shafts.

12. The mechanism as claimed in claim 8, wherein said first supports are hinge shafts.

13. The mechanism as claimed in claim 8, wherein said second supports are sliding shafts.

14. The mechanism as claimed in claim 8, wherein said second supports are hinge shafts.

* * * * *